United States Patent
Vangal-Ramamurthy et al.

(10) Patent No.: US 7,549,204 B1
(45) Date of Patent: Jun. 23, 2009

(54) METHODS FOR PICKING AND PLACING WORKPIECES INTO SMALL FORM FACTOR HARD DISK DRIVES

(75) Inventors: Jambunathan Vangal-Ramamurthy, San Jose, CA (US); Walter W. Butler, Scotts Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 391 days.

(21) Appl. No.: 11/289,922

(22) Filed: Nov. 30, 2005

(51) Int. Cl.
*B23Q 17/00* (2006.01)
(52) U.S. Cl. .................................. 29/407.02; 29/407.04
(58) Field of Classification Search .............. 29/407.02, 29/407.03, 407.04, 407.05, 407.08, 407.09, 29/407.01, 406, 525.01, 525.02, 525.11, 29/703, 707, 709, 710, 712, 743, 240; 901/14, 901/30
See application file for complete search history.

(56) References Cited

U.S. PATENT DOCUMENTS

| | | | |
|---|---|---|---|
| 3,952,880 A | 4/1976 | Hill et al. | |
| 4,639,996 A * | 2/1987 | Fullmer | 29/407.02 |
| 4,761,596 A | 8/1988 | Nio et al. | |
| 5,086,401 A | 2/1992 | Glassman et al. | |
| 5,193,599 A * | 3/1993 | Plaatsman | 157/1.55 |
| 6,550,227 B2 | 4/2003 | Panzarella et al. | |
| 6,681,151 B1 | 1/2004 | Weinzimmer et al. | |
| 6,779,252 B2 | 8/2004 | Tracy et al. | |
| 6,852,007 B1 | 2/2005 | Gonzalez-Martin et al. | |
| 2002/0180960 A1 * | 12/2002 | Koren et al. | 356/237.2 |
| 2004/0128030 A1 | 7/2004 | Nagata et al. | |
| 2005/0049126 A1 | 3/2005 | Everson et al. | |

* cited by examiner

*Primary Examiner*—John C Hong
(74) *Attorney, Agent, or Firm*—Seed IP Law Group (57) ABSTRACT

A method of driving screws may include steps of providing a robotically controlled screw driver, a servo motor assembly for moving the screw driver, at least one controller for controlling the screw driver and the servo motor assembly, and a machine vision assembly coupled to the controller. The screw may be coupled to the screw driver, and the screw may be aligned with a threaded hole using the machine vision assembly and the controller to control the servo motor assembly, such that the screw is aligned with a center of the threaded hole. The aligned screw may then be driven into the threaded hole.

14 Claims, 6 Drawing Sheets

METHODS FOR PICKING AND PLACING WORKPIECES INTO SMALL FORM FACTOR HARD DISK DRIVES

BACKGROUND OF THE INVENTION

1. Field of the Invention

The present invention relates generally to the field of disk drive manufacturing. In particular, embodiments of the present invention are drawn to robotic machines for picking and placing workpieces such as screws on selected features of a hard disk drive being manufactured.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. When the disk or disks are spinning, sliders develop an air bearing relative to the spinning disks that results from a converging channel and from the viscosity of the air. Indeed, a rapidly spinning disk develops a laminar airflow above its surface that lifts the slider away from the disk in opposition to the gram load biasing force. In this state, the slider is commonly said to be "flying", although the sliders do not, in fact, fly or develop an aerodynamic force like lift (as air foils do due to the Bernoulli effect).

Advances in the hard disk drive industry have led to the incorporation of disk drives into a variety of hand held devices, such as music players, cameras and PDAs. The small size of such devices has led to a corresponding reduction in the form factor of high capacity hard disk drives. Conversely, the ability of manufacturers to introduce ever smaller drives has led to their incorporation in ever widening classes of electronic devices and to the development of entirely new classes of devices. Form factors have steadily shrunk from 5.25", 3.5", 2.5", 1.8" and now to 1 inch and smaller drives. As a result of such continuing miniaturization, many of the constituent components of the drives have become too small to be consistently, speedily and reliably handled by human hands. For example, screws that are used in such small form factor drives include so-called 1M screws, which have a diameter of just 1 mm and a head height of just 0.2 mm. These screws are difficult to pick up, couple to a screw driver and drive into a selected threaded hole in a disk drive. Often, such small screws are accidentally driven at an angle into the threaded hole, which may cross-thread the hole and damage the drive. Moreover, as the screws and corresponding holes are so small, manual over-torquing of the screws is also a problem. Even when such small screws are correctly aligned with their intended threaded hole and correctly driven therein, human operators are slow and cannot reliably repeat such precision movements for any extended length of time. Moreover, it has proven to be difficult to manually tighten and loosen these micro screws without breaking them. Thus, broken screws and particulate contaminants from cross-threading may contaminate the disk drives and/or cause operational failures. This decreases the production line's yield. Similar problems are encountered with other drive components, such as, for example, ramp load assemblies and head stack assemblies (HSAs).

Such problems have led to the development of screw driving machines. These machines are traditionally configured to drive screws into threaded holes to a constant and predetermined distance. This constant and predetermined distance is conventionally calculated from the pitch value and the number of turns of threads of each screw. However, while such a process has worked reasonably well for screws larger than M4 or 4-40 screws, the process's disadvantages reveal themselves when applied to smaller screws. For example, for Ml screws currently used in small form factor disk drives, such a process based upon the pitch value and the number of threads tends to lead to an unacceptably high number of high screws (screws that are not fully driven into their threaded holes), cross-threading and other damage to the screws and/or threaded holes, with consequent unwanted generation of particulate matter and decrease in yield. It has become apparent that improved methods, devices and systems for driving small screws into disk drives are needed.

SUMMARY OF THE INVENTION

An embodiment of the present invention is a method of driving screws that may include steps of providing a robotically controlled screw driver, a servo motor assembly for moving the screw driver, at least one controller for controlling the screw driver and the servo motor assembly, and a machine vision assembly coupled to the controller; coupling a screw to the screw driver; aligning the screw with a threaded hole using the machine vision assembly and the controller to control the servo motor assembly, such that the screw is substantially aligned with a center of the threaded hole; and driving the aligned screw into the threaded hole.

The coupling step may be carried out using vacuum from a vacuum assisted nozzle to pick up the screw from a screw feeder station. The driving step may include a step of monitoring the torque exerted on the screw by the screw driver during the driving step. The method may also include a step of designating the driving step as failed when the torque exerted on the screw exceeds a predetermined torque threshold. A step of retrieving and disposing of the screw may be carried out when the torque exerted on the screw exceeds the predetermined torque threshold, and performing the coupling step. The driving step may include a step of monitoring the angular rotation imposed on the screw during the driving step. The method may further include a step of designating the driving step as failed when the angular rotation imposed on the screw during the driving step exceeds a predetermined angular rotation threshold. A step of retrieving and disposing of the screw may be carried out when the angular rotation imposed on the screw during the driving step exceeds the predetermined angular rotation threshold, and performing the coupling step. The method may also include a step of detecting a first thread of the screw prior to carrying out the driving step. The driving step may drive the screw in a first direction, and the detecting step may include a step of driving the screw in a second direction to detect the first thread.

The machine vision assembly may be stationary. Alternatively, the machine vision assembly may be coupled to the servo motor assembly. The method may also include a step of stopping the servo motor assembly when the machine vision assembly is over the threaded hole until the machine vision assembly has finished imaging the threaded hole. Alternatively, the imaging of the threaded hole may be carried out while the servo motor assembly is in motion.

According to another embodiment, the present invention is a robotic screw driver station for driving screws into a threaded hole. The robotic screw driver may include a screw driver configured to engage and drive a screw, a servo motor assembly configured to move the screw driver and the engaged screw, a machine vision assembly configured to capture an image of the threaded hole, and a controller coupled to the servo motor assembly and to the machine vision assembly. The controller may be operable to use the captured image to determine an estimated center of the threaded hole; control the servo motor assembly to align the screw driver and the engaged screw with the estimated center of the threaded hole; and cause the screw driver to drive the aligned screw into the threaded hole.

The controller may be further operable to monitor the torque exerted on the aligned screw by the screw driver. The controller may be further operable to designate a driving failure when the torque exerted on the aligned screw exceeds a predetermined torque threshold when the screw is driven into the threaded hole. The controller may be further operable to monitor the rotational angle imposed on the aligned screw when the screw is driven into the threaded hole. The controller may be further operable to designate a driving failure when the rotational angle imposed on the aligned screw exceeds a predetermined rotational angle threshold when the screw is driven into the threaded hole. The screw driver may include a vacuum-assisted screw driver nozzle that may be configured to pick up the screw from a screw feeder station using vacuum. The controller may be further operable to detect a first thread of the screw prior to causing the screw driver to drive the aligned screw into the threaded hole. The controller may be operable to cause the screw driver to drive the screw in a first direction when driving the screw into the threaded hole and to drive the screw in a second direction when detecting the first thread of the screw. The machine vision assembly may be stationary. Alternatively, the machine vision assembly may be coupled to the servo motor assembly. The servo motor assembly may be further configured to stop when the machine vision assembly is over the threaded hole until the machine vision assembly has finished capturing the image of the threaded hole. The machine vision assembly may be further configured to capture the image of the threaded hole while the servo motor assembly is in motion.

A still further embodiment of the present invention is a method of placing a workpiece relative to a disk drive. Such a method may include steps of providing a robotically controlled pick and place station, a servo motor assembly for moving the pick and place station, a controller for controlling the servo motor assembly, and a machine vision assembly coupled to the controller; picking up a workpiece with the pick and place station; capturing an image of a selected feature of the disk drive using the machine vision assembly; aligning the workpiece with the selected feature using the controller and the captured image of the selected feature to control the servo motor assembly to move the pick and place station; and placing the aligned workpiece onto or into the selected feature of the disk drive.

For example, the workpiece may include a ramp load assembly. The workpiece may alternatively include a head stack assembly, and the selected feature may include a pivot bearing cartridge. The method may also include a step of orienting the workpiece in an orientation determined by the controller according to the captured image of the selected feature. The method may also include a step of monitoring the force imposed on the workpiece during the placing step. A step of designating the placing step as failed may be carried out when the force imposed on the workpiece during the placing step exceeds a predetermined force threshold. A step of retrieving and disposing of the workpiece may be carried out after the placing step is designated as failed, and performing the picking up step. The selected feature may define a threaded hole, and the workpiece may include a screw. The step of aligning the workpiece may include aligning the screw with an estimated center of the threaded hole, and the step of placing the aligned workpiece may include driving the aligned screw into the threaded hole. The pick and place station may include a vacuum assisted nozzle, and the picking up step may be carried out using vacuum from the vacuum assisted nozzle. The capturing step may be carried out while the machine vision assembly is stationary. The machine vision assembly may be further coupled to the servo motor assembly. The capturing step may include a step of stopping the servo motor assembly when the machine vision assembly is over the selected feature until the machine vision assembly has finished capturing the image of the selected feature. The capturing step may be carried out while the servo motor assembly is in motion.

Another embodiment of the present invention is a robotic station for placing workpieces onto a selected feature of a disk drive. The robotic station may include a robotically controlled pick and place station configured to engage a workpiece; a servo motor assembly for moving the pick and place station; a machine vision assembly configured to capture an image of the selected feature of the disk drive; and a controller coupled to the servo motor assembly and to the machine vision assembly. The controller may be operable to align the workpiece with the selected feature using the captured image of the selected feature to control the servo motor assembly to move the pick and place station; and place the aligned workpiece onto or into the selected feature of the disk drive.

The workpiece may include a ramp load assembly, for example. The workpiece may include a head stack assembly, and the selected feature may include a pivot bearing cartridge. The controller may be further operable to orient the workpiece in an orientation determined by the captured image of the selected feature. The controller may be further operable to monitor the force imposed on the workpiece during the placing step. The controller may be further operable to designate a failed placement when the force imposed on the workpiece during placement exceeds a predetermined force threshold. The controller may be further operable to retrieve and dispose of the workpiece after a failed placement. The selected feature may define a threaded hole, the workpiece may include a screw, and the controller may be further operable to align the screw with a center of the threaded hole, and to drive the aligned screw into the threaded hole of the selected feature. The pick and place station may include a vacuum assisted nozzle, and the pick and place station may be configured to engage the workpiece using vacuum from the vacuum assisted nozzle. The machine vision assembly may be stationary or may be coupled to the servo motor assembly. The servo motor assembly may be further configured to stop when the machine vision assembly is over the selected feature until the machine vision assembly has finished capturing the image of the selected feature. The machine vision assembly may be further configured to capture the image of the selected feature while the servo motor assembly is in motion.

DESCRIPTION OF THE PREFERRED EMBODIMENTS

Figure 1:
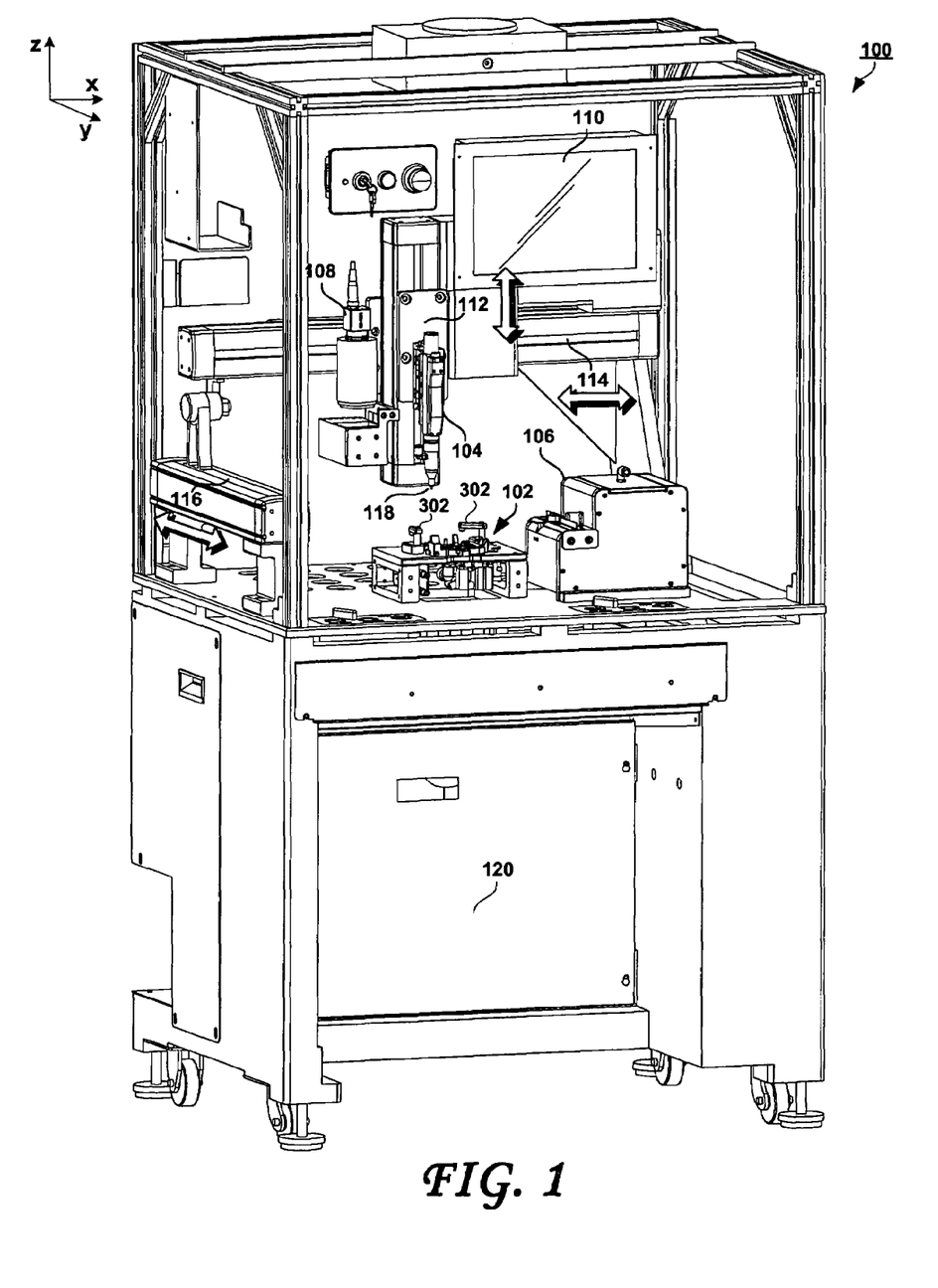
FIG. 1 shows a robotic station for picking and placing workpieces such as screws into small form factor hard disk drives, according to an embodiment of the present invention.
Figure 2:
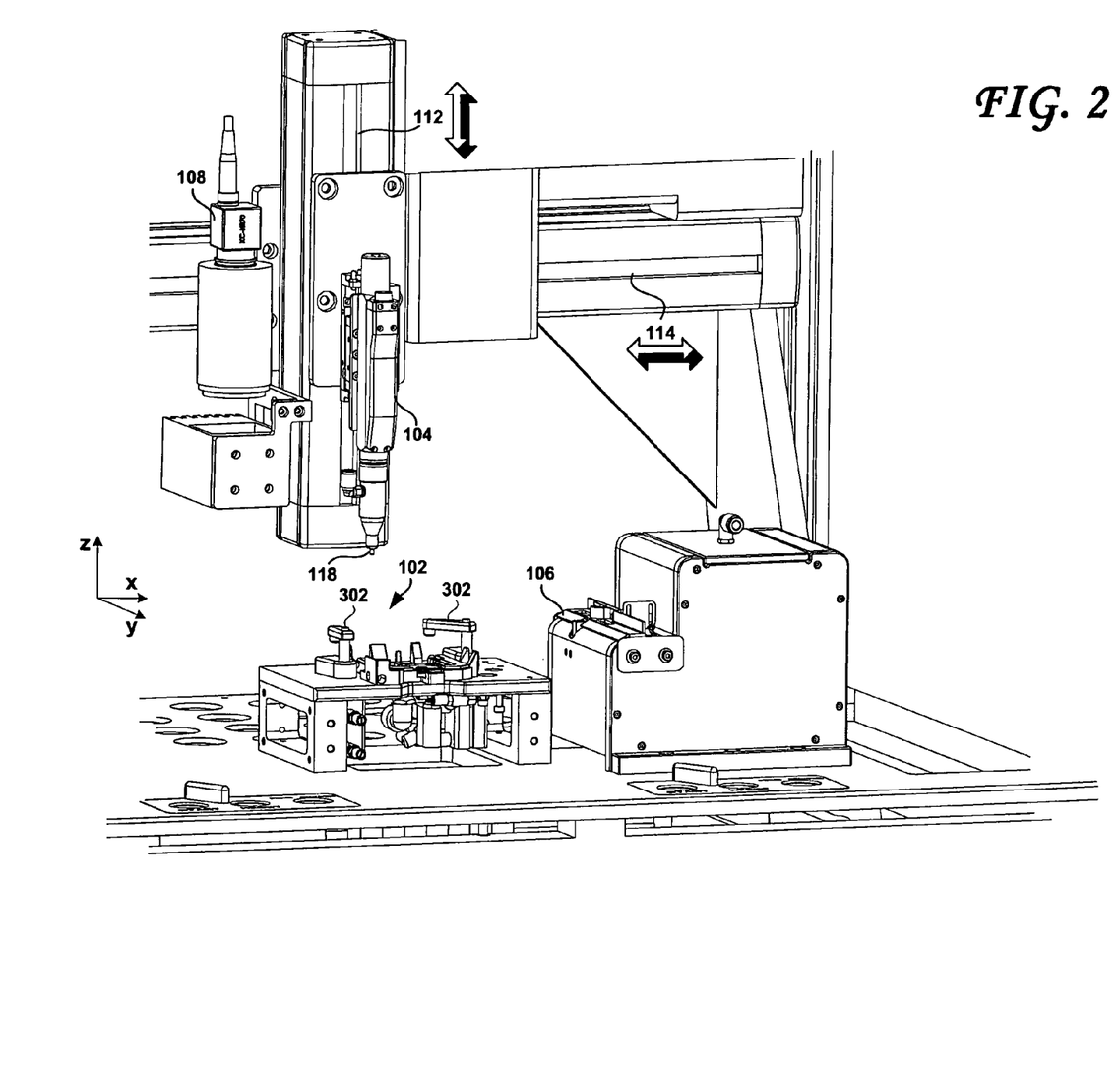
FIG. 2 is a detail view of a portion of the robotic station of FIG. 1.
Figure 3:
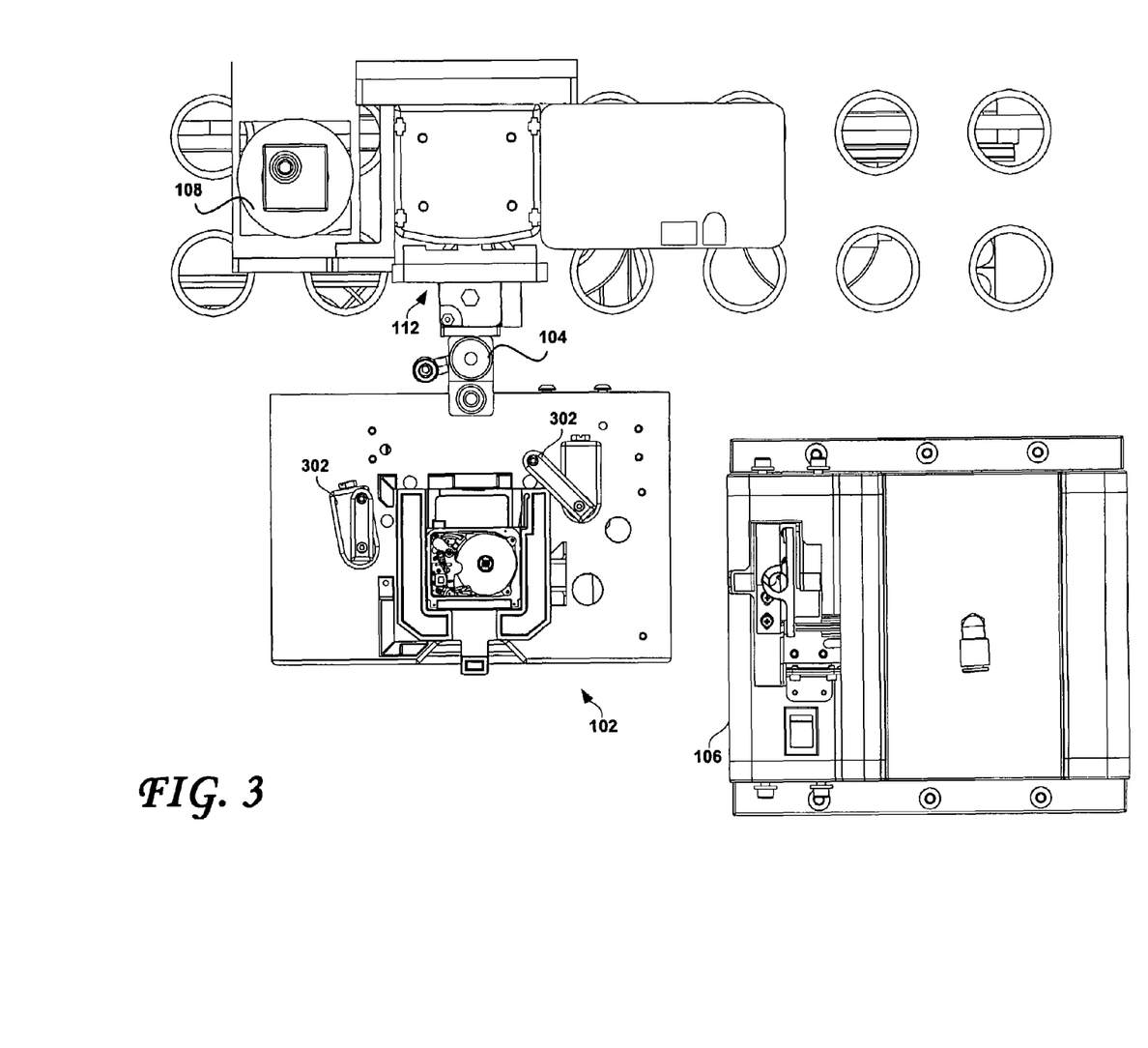
FIG. 3 is a top view of a portion of the station of FIG. 1.

FIG. 1 shows a robotic station 100 for picking and placing workpieces into small form factor hard disk drives, according to an embodiment of the present invention. FIG. 2 is a detail view of a portion of the robotic station of FIG. 1, and FIG. 3 is a top view of a portion of the pick and place station of FIGS. 2 and 3. A number of cover panels have been removed in these views, to allow further detail to be shown. The workpieces that may be picked and placed using embodiments of the present invention may include, for example, screws or other fasteners, ramp load and latch assemblies, head stack assemblies and the like. Considering now FIGS. 1, 2 and 3 collectively and according to an embodiment in which the workpiece are screws or similar fasteners, the robotic station 100 may include an electric screw driver 104 that is commercially available, for example from Microtec Systems GmbH of Germany. One of the tasks of the screw driver 104 is to torque the miniature screws used in the hard disk assembly to targeted torque and angular rotation values. The electric screw driver 104 may, as shown, be coupled to a positioning gantry that enables the electric screw driver 104 to be selectively moved along the x, y and z axes. As shown, the positioning gantry may include a servo motor assembly that may include one or more servo motors and a high resolution encoder coupled thereto. The servo motor(s) and the high resolution encoder may be coupled to a programmable Logic Controller (PLC) based controller to control the motion and position of the screw driver 104. The positioning gantry may include a rail assembly 112 that enables the electric screw driver 104 to be moved along the z axis (up and down in the view of FIGS. 1 and 2), a rail assembly 114 that enables the electric screw driver 104 to be moved along the x axis (left and right in the view of FIGS. 1 and 2) and a rail assembly 116 that enables the electric screw driver 104 to be moved along the y axis (into and out of the page in the view of FIGS. 1 and 2). The screw driver 104 may be directly mounted on the rail assembly 112 that enables the electric screw driver 104 to be moved along the z axis. Although the embodiment of FIGS. 1-3 are drawn to a robotic screw driver with pick and place functionality, a similar station may be used as a universal platform during other manufacturing steps including, for example, head stack assembly install, ramp load install or latch assembly install to name but a few possibilities.

In operation, an operator of the pick and place station 100 (or an automatic conveyance system) may clamp the hard disk drive being manufactured onto a registration nest, such as shown at 102. The registration nest 102 may include one or more clamps 302 for clamping the disk drive (not shown) onto the registration nest 102. As soon as the disk drive under manufacture is clamped onto the registration nest 102, the electric screw driver 104 may be moved by the servo motor(s) of the positioning gantry to a screw feeding and presenting assembly, as shown at reference numeral 106. The screw feeding and presenting assembly 106 may be configured to store a great many screws and to present them, appropriately oriented, to the electric screw driver 104. The electric screw driver 104, positioned above a screw presented at the screw feeding and presenting assembly 106, may then pick up a screw. According to an embodiment of the present invention, the presented screw may be picked up using suction (e.g., a vacuum). Toward that end, the electric screw driver 104 may be provided with a vacuum assisted nozzle 118 that may assist in the pick and place operations of the station 100. Other means for picking up the screw (e.g., coupling the screw to the electric screw driver 104 using a magnetic screw bit) may be used. When the electric screw driver 104 is operated in a clean room environment, it may be appreciated that vacuum provides the advantage of minimizing particulate generation. After the screw is picked up, the positioning gantry may be controlled to move the electronic screw driver 104 over the disk drive clamped in the registration nest 102.

The operation of the electric screw driver 104 and its movement on the positioning gantry may be controlled by a PLC-based controller. Once the hard disk is placed on the registration nest 102, the PLC (which may be programmed in V+ and AIM, for example) may command the screw driver to approach the screw hole using the servo motor(s), the high resolution encoder and the positioning gantry. As soon as the screw driving process starts, the PLC-based screw driver controller may begin to monitor the torque imposed upon the screw during the driving process as well as the number of turns (the angle of rotation) imposed on the screw. At the end of the process, the PLC-based screw driver controller may dump the torque and angle of rotation data into a PC for statistical analysis. Both the PC and the PLC-based screw driver controller may be located within the station 100 (such as within the cabinet 120, for example) or may be located at some remote location.

Although the controller is implemented as a programmable Logic Controller in a preferred embodiment, it should be understood by those skilled in the art that any suitable controller or processor may implement the functionality described herein. Indeed, the controller may comprise a plurality of microprocessors and controllers working to perform the desired functions. In one embodiment, the controller may comprise a microprocessor executing instructions, the instructions being operable to cause the microprocessor to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor. In yet another embodiment, the controller comprises suitable logic circuitry, such as state machine circuitry. Furthermore, while in some embodiments, the controller may forward torque and angle of rotation data to an external PC for analysis, in other embodiments, the controller itself may analyze this data to make a success determination.

According to an embodiment of the present invention, the pick and place station 100 may be provided with machine vision capabilities, which reduces the chances of operator errors, such as stripping the head recesses of the screws, cross threading and over-torquing, and prevents (or at least significantly reduces) particle contamination. Indeed, the pick and place station 100 preferably includes a machine vision assembly, as shown at 108. The machine vision assembly 108 may be operable to image the threaded hole to assist in the driving of the screw therein. The image of the threaded hole captured by the machine vision assembly may then be used by the PLC-based controller to determine approximately the coordinates of the center of the threaded hole. A suitable machine vision assembly is available, for example, from Adept Technology, Inc. of Livermore, Calif. The machine vision assembly may utilize a pattern recognition tool to detect the presence of the threaded hole in the machine vision assembly's field of view. The machine vision assembly may then use a circle finder tool to refine the detected hole and draws a circle around the detected threaded hole. The center of this drawn circle may then be estimated. The estimated location of the center of the threaded hole may then be converted and fed to the screw driver's PLC-based controller. As the PLC-based controller knows where the camera is mounted (the location thereof having been determined during the camera calibration, for example), the screw driver 104 may be commanded to move to the estimated center of the detected threaded hole. The machine vision assembly 108 may include, for example, a high resolution black and white progressive scan CCD (Charge Coupled Device) video camera such as the XC-HR70 available from Sony Corporation. The XC-HR70 features a ⅓" type IT progressive scan CCD and has a horizontal resolution of 1034 pixels and a vertical resolution of 779 pixels, enabling it to capture images at 29 f/s. Other video cameras may be used, and the optics thereof adapted to the specific requirements of the implementation at hand. In an alternative embodiment, a video camera need not be used, but instead a single image of the threaded hole may be captured by the machine vision assembly 108 in order to facilitate the orientation of the screw driver 104. Indeed, as would be clear to one skilled in the art, any means for capturing a preferably high-resolution image may be used.

The machine vision assembly 108 may be stationary (e.g., attached to a fixed mount) or may be movable. When the machine vision assembly 108 is movable, it may be coupled to the positioning gantry or to a separate robotic arm. According to an embodiment of the present invention, the machine vision assembly 108, when movable, may be configured to image the threaded hole while the robotic arm or positioning gantry to which it is coupled is stationary. However, this requires the robotic arm or positioning gantry to stop, image the threaded hole and to move away from the hole to allow the screw driver to assume its position over the center of the imaged threaded hole or other selected feature. This process is costly both in terms of cycle time and ultimate yield of the manufacturing line.

According to another embodiment, the machine vision assembly 108 may image the threaded hole "on the fly"; that is, while the positioning gantry (or other robotic arm to which the machine vision assembly 108 may be coupled) is in motion. According to this embodiment, the machine vision assembly images the threaded hole while the screw driver 104 is moving from feeding and presenting assembly 106 to its position over the center of the imaged threaded hole. To do so, the machine vision assembly 108 and the positioning gantry or other robotic arm may be synchronized such that when the threaded hole to be imaged comes within the field of view of the machine vision assembly 108, the machine vision assembly 108 images the threaded hole using, for example, a strobe light to capture the image of the threaded hole and to provide precisely timed illumination. In this manner, the machine vision assembly 108 need not be stopped to obtain an image of the threaded hole, which results in a smooth motion profile of the screw driver 104/machine vision assembly 108 from its starting position over the feeding and presenting assembly 106 to its final target position over the center of the imaged threaded hole. This reduces the cycle time and correspondingly increases the manufacturing yield, as compared to embodiments in which the machine vision assembly must be stopped over the threaded hole to obtain the image.

Once the electric screw driver 104 and coupled screw are aligned with the detected center of the threaded hole defined within the hard disk drive under manufacture, the electric screw driver 104 may then be controlled to drive the aligned screw into the threaded hole. Thereafter, the pick and place station 100 may then be controlled to cause the electric screw driver to return to the feeding and presenting assembly 106 to pick up another screw.

Figure 4:
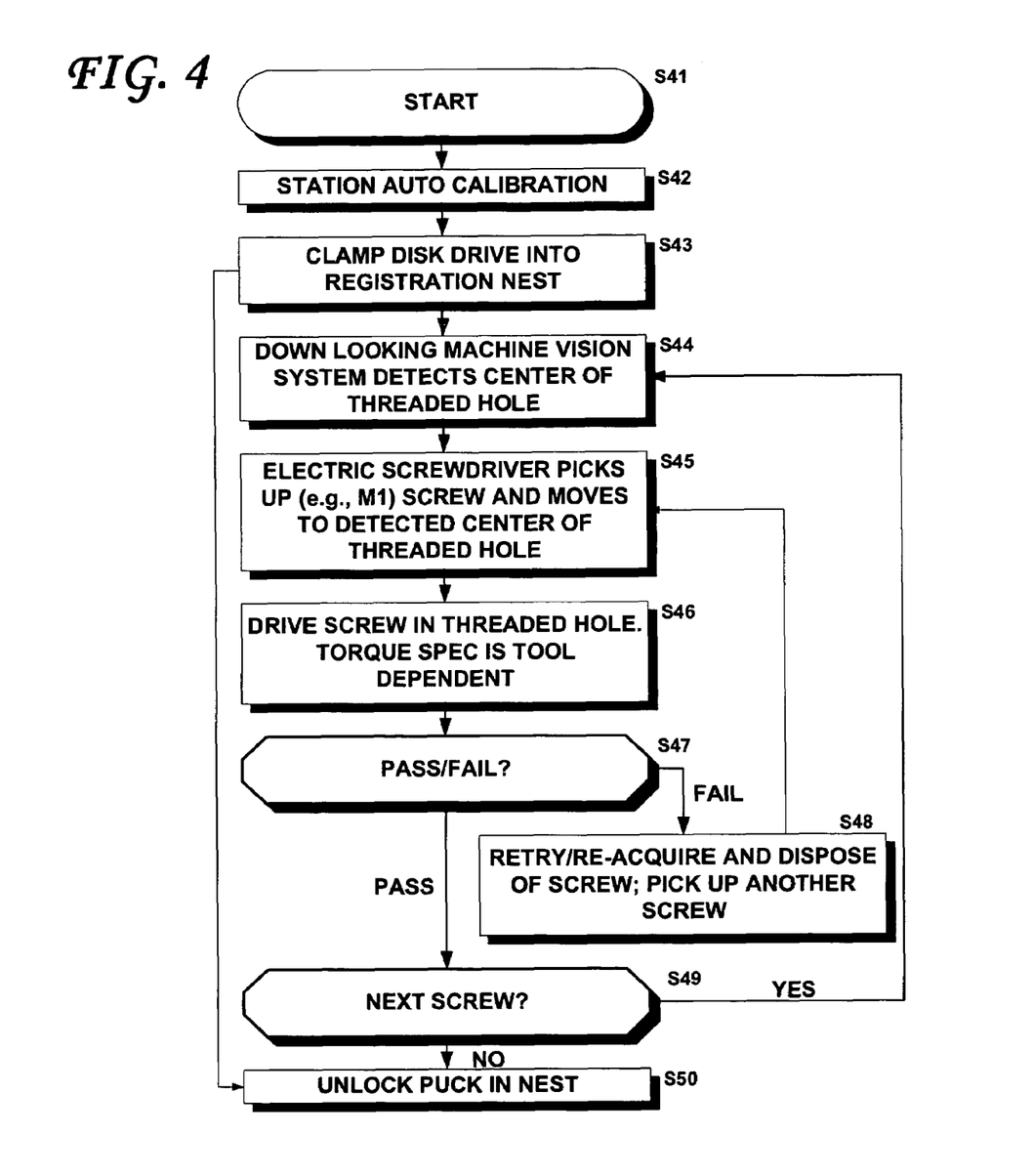
FIG. 4 is a flowchart of a method of driving screws, according to an embodiment of the present invention.

FIG. 4 is a flowchart of a method of driving screws, according to an embodiment of the present invention. As shown therein, the method starts at S41. Thereafter, the pick and place station 100 may perform an auto calibration procedure as shown at S42. During the auto calibration procedure, the puck is placed on the registration nest 102 and a calibration routine is run. The auto calibration may, for example, determine the location of a threaded hole and calculate the offset of the camera of the machine vision system relative to the determined location of the threaded hole. The disk drive under manufacture may be clamped into the registration nest 102, as called for by S43. The disk drive under manufacture (or a portion thereof—e.g., a head disk assembly) may first be secured into a support (sometimes called a puck), and this support may then be clamped into the registration nest 102. The puck and registration nest 102 maintain the disk drive under manufacture stationary, and counter the torsional forces imposed upon the drive during the screw driving operations(s). The machine vision system 108 is effective to compensate for any variations in the precise placement of the puck within the registration nest 102. The machine vision assembly 108 may capture an image of the threaded hole, and this captured image may then be used by the PLC-based screw driver controller to calculate an approximate center of the threaded hole, as shown at S44. The positioning gantry may then be controlled by the PLC-based screw driver controller to move the electric screw driver 104 to the screw feeding and presenting assembly 106, to pick up a screw and to move the electric screw driver 104 and screw to (e.g., over) the calculated center of the threaded hole in the disk drive under manufacture, as shown at S45. The screw may then be driven into the threaded hole, as called for by step S46.

The screw driving operation may then be evaluated to determine whether the operation passed or failed, as shown at S47. If the driving operation has not been successful, step S48 may be carried out. Step S48 calls for the driving operation to be retried with the same or a new screw. If the driving operation is retried with a new screw, the screw that was not driven properly may be re-acquired, and the re-acquired screw may be discarded. The screw driver may then pick up a new screw from the screw feeding and presenting assembly 106, whereupon the method may revert to step S45 to attempt the driving operation again. If, however, the operator or the machine vision assembly 108 determines that the threaded hole has been damaged, the drive under manufacture may be removed from the registration nest 102 and sent to rework or discarded.

If the driving operation has been successful and the disk drive under manufacture requires another screw (YES branch of step S49), the method may revert back to step S44, whereupon the machine vision assembly 108 and the PLC-based screw driver controller may detect the center of the threaded hole in which the next screw is to be driven. When the last screw has been driven (NO branch of step S49), the operator (or other automatic mechanism) may unlock the puck (and the disk drive under manufacture secured therein) from the registration nest 102, as called for by step S50. It will be understood that although the above steps are illustrated as taking place in a particular order, other embodiments of the present invention may employ similar steps in any order to achieve a desired result.

Step S47 requires a determination of whether the screw driving operation was successful. One of the possible criteria for determining whether the driving operation was successful is the torque exerted on the screw during the driving operation. According to an embodiment of the present invention, the torque exerted on the screw by the electric screw driver 104 during the driving step may be monitored in real or near real time during the driving step using, for example, one or more in-line shaft torque transducers. For example, the driving step S46 may be designated as failed when the torque exerted on the screw exceeds a predetermined torque threshold. For example, when the torque exerted on the screw during the driving operation exceeds a predetermined threshold, step S48 may be carried out, and the screw may be retrieved and disposed of, and a new screw may be acquired to attempt the driving operation once again. Another of the possible criteria for determining whether the driving operation was successful is the number of turns imposed upon the screw during the driving operation. Toward that end, the angular rotation imposed upon the screw during the driving step may be monitored using, for example, a rotary encoder for angle counting. Similarly, the driving step may be designated as failed in step S47 when the angular rotation imposed on the screw during the driving step exceeds a predetermined angular rotation threshold. When the angular rotation imposed upon the screw exceeds the predetermined angular threshold, the screw driving operation may be retried or the screw used during the failed driving operation may be retrieved and disposed of. A new screw may then be re-acquired and the driving operation re-attempted, as called for by step S48.

According to embodiments of the present invention, therefore, both the torque and the angular rotation imposed upon the screw may be monitored during the screw driving process. By monitoring the torque, the screw driver controller may determine whether and when a predetermined torque limit or target value has been reached. This insures that the screw is not under tightened (monitored torque under the torque limit or target value) or over tightened (monitored torque over the torque limit or target value). By monitoring the angular rotation imposed upon the screw, it may be determined whether a screw has been cross threaded. If a screw is cross threaded, then the monitored angular rotation (e.g., the number of turns of the screw within the threaded hole) would show that a minimum required angle has not been reached, which is one type of failure mode. For example, if the screw to be driven has four threads, then the screw should be rotated a minimum targeted angular value of 1440 degrees (4 threads*360 degrees per thread). For example, if the monitored angular rotation only reaches 500 degrees, such a value may indicate that the torque limit or target value has been reached or exceeded but that minimum targeted angular value has not been reached, which may be indicative that the threaded hole into which the screw is to be driven is cross-threaded. On the other hand, if the screw is stripped (often indicating that the screw head has been damaged), the stripped screw may, in fact, reach the minimum targeted angular value but not the torque limit or target value torque, which is also another type of failure mode. When the screw driving process is determined to have been unsuccessful, the screw driver 104 may be controlled to perform a process to unscrew the screw from the threaded hole. Indeed, when a screw driving failure is detected, the PLC-based screw driver controller may be switched to an "Unscrewdriving" process where the screw driver 104 is controlled to rotate the screw bit (configured as a Torx bit in one embodiment) in the opposite direction to remove the screw. The screw driver 104 may then be controlled to dump the removed screw in a bin and to retry the screw driving process. However, it may not be time and/or cost efficient to remove the screw and to attempt to drive another screw, as the time necessary to remove the screw and drive another screw may hold up and unbalance the entire manufacturing line. According to another embodiment, a human operator may simply remove the unsuccessfully driven screw and start the screw driving process over again.

According to an embodiment of the present invention, both the torque exerted and the angular rotation imposed upon the screw may be monitored during the screw driving operation. However, unless the first thread is detected precisely, even the use of rotary encoders for angle counting and in-line shaft torque transducers may not be sufficient to insure a successful screw driving operation. There could be a difference of up to 360 degrees in angle from the engagement of the first thread, which may undesirably shift the domain of screw parameters. To address this issue, an embodiment of the present invention calls for a step of detecting the first thread of the threaded hole. Assuming that the driving operation drives the screw in a first direction (e.g., the clockwise direction), the first thread may be detected by first driving the screw in a second direction that is opposite the first direction (e.g., the counterclockwise direction).

To detect the first thread, the screw may be driven by the electric screw driver in a direction that is opposite to that used to drive the screw (e.g., counterclockwise), and the torque imposed upon the screw is monitored for so-called negative torque or relaxation. Negative torque or relaxation may be seen when the screw is driven in the counterclockwise direction and ramps up and down the first winding or helix of the thread. The point at which the screw drops back down after ramping up the helical first thread while rotated counterclockwise may be defined as the start of the first thread. According to an embodiment of the present invention, the monitoring of the torque and the angular rotation may then begin from the determined start of the first thread.

Figure 5:
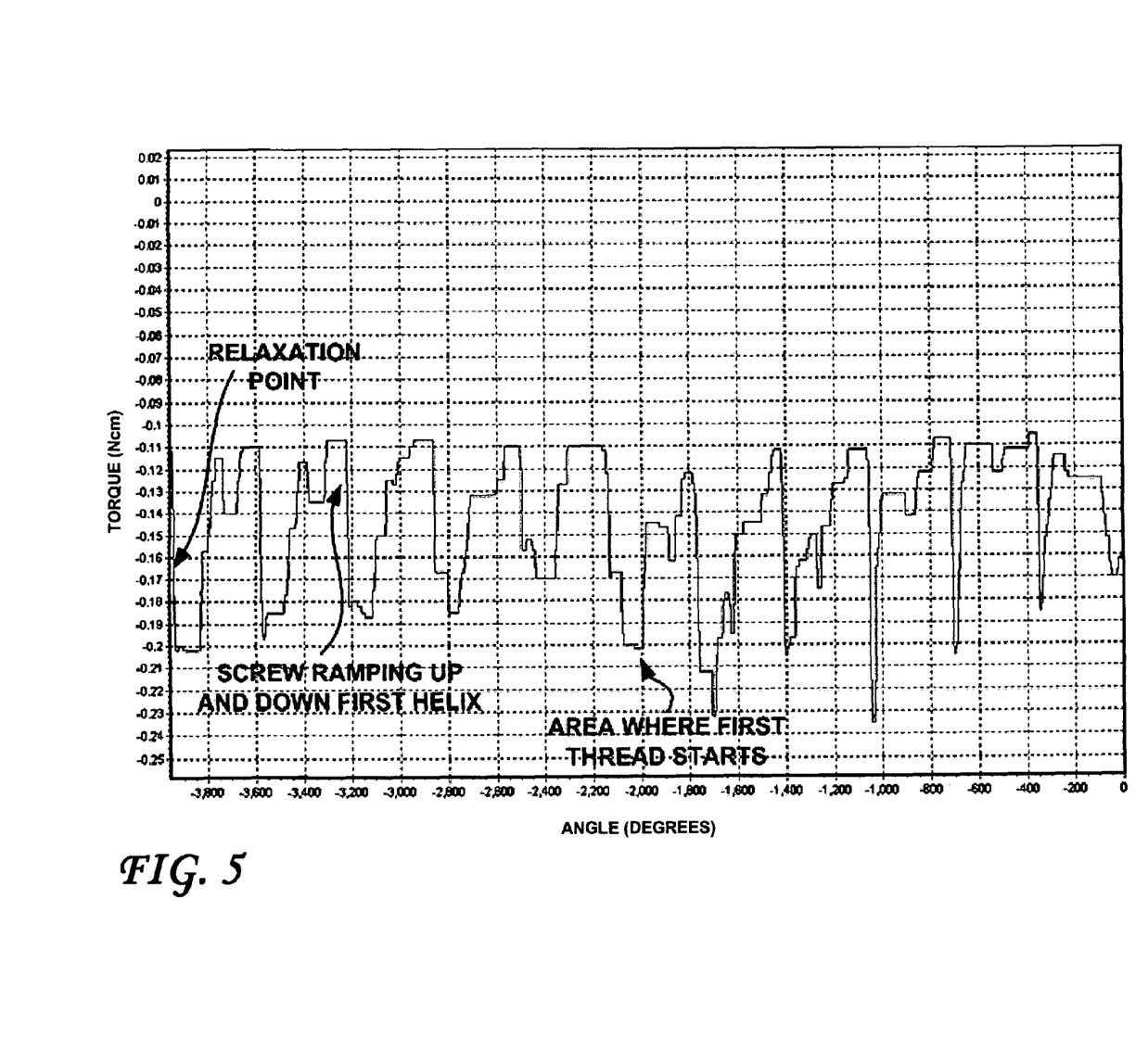
FIG. 5 is a graph showing measured torque relative to angular rotation as a screw is driven in a counterclockwise direction into a threaded hole of a disk drive component to determine the relaxation point, according to an aspect of the present invention.

FIG. 5 is a chart showing measured torque relative to angular rotation as a screw is driven in a counterclockwise direction into a threaded hole of a disk drive component to determine the relaxation point, according to an aspect of the present invention. FIG. 5 shows the torque imposed upon the screw in Ncm relative to the angular rotation expressed in negative degrees from an initial 0 degrees at the right hand side of the graph. As can be seen therein, the torque on the counterclockwise driven screw varies cyclically about every 360 degrees, with a large drop each time (10 times in the example illustrated in FIG. 5) the screw reaches the beginning of the first helical ramp of the first thread. By detecting where the first thread starts, the torque and angular rotation subsequently imposed upon the screw during the driving operation may be monitored from a known start point, further increasing the effectiveness of embodiments of the present invention.

Figure 6:
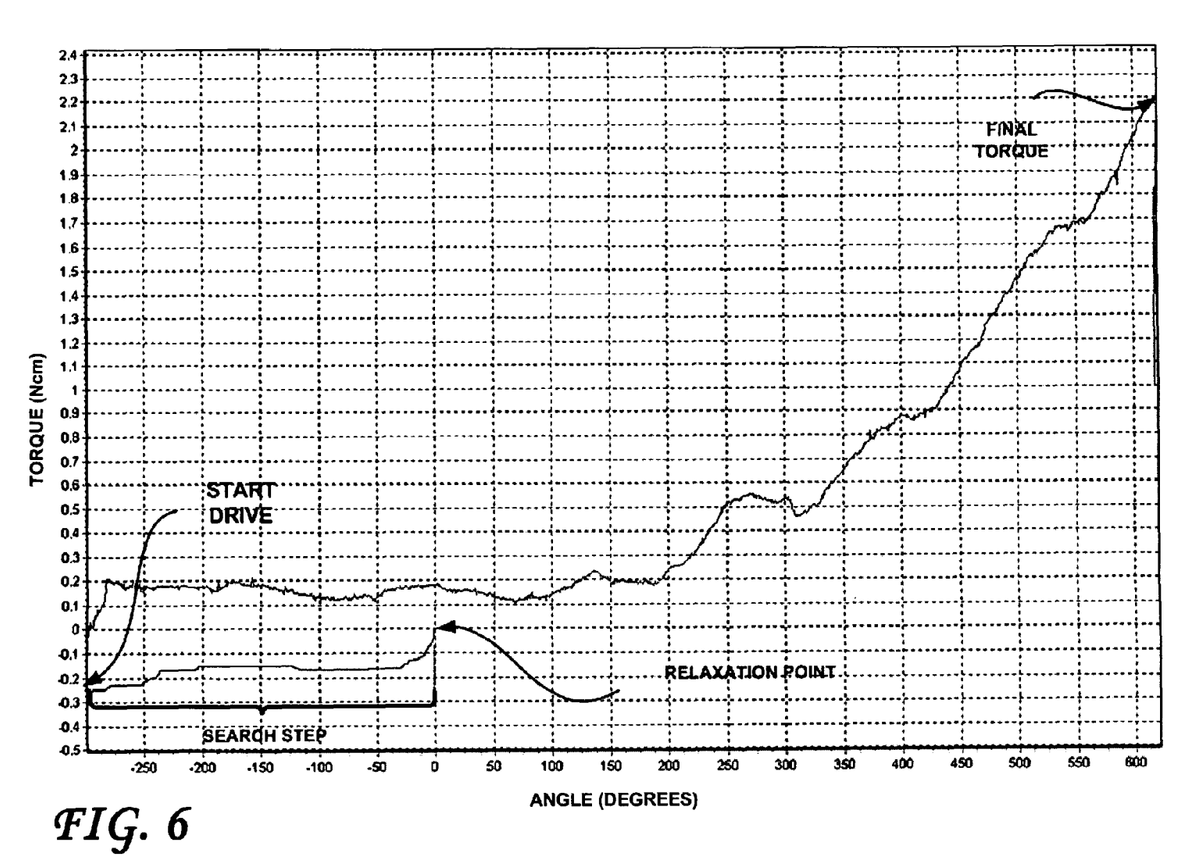
FIG. 6 is a graph showing measured torque relative to angular rotation as the screw is driven in a clockwise direction into a threaded hole of a disk drive component, according to a further aspect of the present invention.

As shown in FIG. 6, the driving step may be preceded by a search step during which the relaxation point is found. When the relaxation point is found, indicating the beginning of the first thread, the screw driving step may begin and the driving direction of the electric screw driver 104 reversed to the clockwise direction. The screw may then be driven to a predetermined final torque value and/or for a predetermined number of rotations.

During the driving step, an electronic record may be kept of the final torque value and/or of the number of rotations of the screw. An indication of whether the driving step is successful may also be written to the electronic record, as may a time stamp, the driving step duration and/or other parameters. This electronic record may be stored in persistent storage and/or displayed on a display monitor, such as shown at reference numeral 110 in FIG. 1. The display monitor 110 may display a user interface front end that is controlled by the PC or controller and programmed in C#, for example.

When embodiments of the present inventions are used in a clean room environment, a positive laminar airflow may be maintained within the station 100. The positive airflow ensures that particles that may be liberated from the disk handling during screw driving do not migrate into or otherwise contaminate the media or the clean environment.

As may be appreciated, the pick and place station 100 may readily be modified to render it suitable for pick and place operations other than screw driving. For example, the pick and place station 100 may be suitably modified to pick and place head stack assemblies, where the positioning gantry assembly may be used to pick up the head stack assemblies from a material tray and to place the head stack assemblies onto a predetermined feature on the disk drive base, as determined by the machine vision assembly 108 and the PLC-based screw driver controller. In such an embodiment, the pick and place station may comprise a gripper end effector configured to engage an HSA, and configured to move it over a pivot bearing cartridge. Preferably, as disclosed above, an image of the selected feature (e.g., the pivot bearing cartridge) is captured by the machine vision assembly. The gripper engages the HSA in a manner well known to those skilled in the art, and the PLC-based screw driver controller controls the gripper using a positioning gantry and the captured image to align the gripper and HSA with the selected feature. Once aligned, or during alignment, the PLC-based screw driver controller preferably places the HSA onto the pivot bearing cartridge in a preferred orientation.

In another embodiment, the machine vision assembly may first capture an image of the workpiece, i.e., the HSA. Then, the pick and place station, i.e., the gripper, may be used to pick up the workpiece, and the PLC-based screw driver controller may utilize the captured image of the workpiece to estimate an orientation of the workpiece. When the workpiece is finally aligned and placed with respect to the selected feature of the disk drive, the controller may also ensure that the workpiece is placed in an appropriate orientation with respect to the disk drive.

As discussed above with respect to the screw driving embodiment, at least one of the forces imposed upon the workpiece may also be monitored during the placing step to ensure that the placing step has been successful. In one embodiment, if the monitored force exceeds a predetermined force threshold, the placing step may be designated as failed. If the placing step is designated as failed, the workpiece may be retrieved and disposed of, and the method may begin from the beginning. For example, if an HSA is being placed on a pivot bearing assembly, the pick and place station may monitor the downward force necessary to engage the two parts, and the placing step may be designated a failure if the downward force exceeds some maximum force necessary to engage the parts.

Latch and ramp assemblies (for example) may also be picked and placed into the drive under manufacture in a similar manner. To install ramp assemblies, the machine vision assembly 108 may be used to detect an approximate center of a ramp pin on the disk drive base, and the positioning gantry assembly may be used to position a suitable tool (instead of the electric screw driver 104) over the detected center of the ramp pin. Thereafter, the tool may orient the ramp and insert the ramp on the ramp pin with a predetermined and suitable amount of force.

What is claimed is:

1. A method of driving screws, comprising:
providing a robotically controlled screw driver, a servo motor assembly for moving the screw driver, at least one controller for controlling the screw driver and the servo motor assembly, and a machine vision assembly coupled to the controller;
generating an image of a screw using the machine vision assembly;
aligning the screwdriver to the screw using the image;
coupling the screw to the screw driver;
generating an image of a threaded hole using the machine vision assembly;
aligning the screw with the threaded hole based at least in part upon the image using the controller to control the servo motor assembly, such that the screw is substantially aligned with a center of the threaded hole; and
driving the aligned screw into the threaded hole.

2. The method of claim 1, wherein the coupling is carried out using vacuum from a vacuum assisted nozzle to pick up the screw from a screw feeder station.

3. The method of claim 1, wherein the driving includes monitoring a torque exerted on the screw by the screw driver during the driving.

4. The method of claim 3, further comprising designating the driving as failed when the torque exerted on the screw exceeds a predetermined torque threshold.

5. The method of claim 4, further comprising retrieving and disposing of the screw when the torque exerted on the screw exceeds the predetermined torque threshold, and performing the coupling.

6. The method of claim 1, wherein the driving includes monitoring an angular rotation imposed on the screw during the driving.

7. The method of claim 6, further comprising designating the driving as failed when the angular rotation imposed on the screw during the driving exceeds a predetermined angular rotation threshold.

8. The method of claim 7, further comprising retrieving and disposing of the screw when the angular rotation imposed on the screw during the driving exceeds the predetermined angular rotation threshold, and performing the coupling.

9. The method of claim 1, further including detecting a first thread of the screw prior to carrying out the driving.

10. The method of claim 9, wherein the driving drives the screw in a first direction, and wherein the detecting includes driving the screw in a second direction to detect the first thread.

11. The method of claim 1, wherein the machine vision assembly is stationary.

12. The method of claim 1, wherein the machine vision assembly is coupled to the servo motor assembly.

13. The method of claim 12, further comprising stopping the servo motor assembly when the machine vision assembly is over the threaded hole until the machine vision assembly has finished generating the image of the threaded hole.

14. The method of claim 12, wherein generating the image of the threaded hole includes imaging the threaded hole while the servo motor assembly is in motion.

* * * * *